United States Patent
Wu et al.

(10) Patent No.: US 11,038,558 B2
(45) Date of Patent: Jun. 15, 2021

(54) APPARATUS AND METHOD FOR DETERMINING NETWORK CONFIGURATION IN WIRELESS COMMUNICATION SYSTEM

(71) Applicant: Samsung Electronics Co., Ltd, Suwon-si (KR)

(72) Inventors: Shangbin Wu, Middlesex (GB); Yinan Qi, Middlesex (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/638,119

(22) PCT Filed: Aug. 10, 2018

(86) PCT No.: PCT/KR2018/009219
§ 371 (c)(1),
(2) Date: Feb. 10, 2020

(87) PCT Pub. No.: WO2019/031935
PCT Pub. Date: Feb. 14, 2019

(65) Prior Publication Data
US 2020/0244317 A1 Jul. 30, 2020

(30) Foreign Application Priority Data

Aug. 10, 2017 (GB) .................................... 1712852

(51) Int. Cl.
*H04L 1/02* (2006.01)
*H04B 7/024* (2017.01)
*H04B 7/06* (2006.01)

(52) U.S. Cl.
CPC ............. *H04B 7/024* (2013.01); *H04B 7/063* (2013.01)

(58) Field of Classification Search
CPC ..... H04L 1/0618; H04L 1/06; H04L 27/2647; H04L 5/0007; H04W 72/048; H04W 72/0446; H04W 56/001; H04B 7/088
(Continued)

(56) References Cited

U.S. PATENT DOCUMENTS

| 10,141,987 | B2 | 11/2018 | Kim et al. |
| 2013/0201840 | A1 | 8/2013 | Sorrentino et al. |
| 2013/0279437 | A1 | 10/2013 | Ng et al. |
| 2014/0092827 | A1 | 4/2014 | Jongren et al. |

(Continued)

FOREIGN PATENT DOCUMENTS

| EP | 2654333 A1 | 10/2013 |
| WO | 2014/112938 A1 | 7/2014 |

(Continued)

OTHER PUBLICATIONS

"3rd Generation Partnership Project; Technical Specification Group Radio Access Network; Evolved Universal Terrestrial Radio Access (E-UTRA); Physical layer procedures (Release 14)", 3GPP TS 36.213 V14.3.0 (Jun. 2017), 263 pages.

(Continued)

*Primary Examiner* — Khai Tran

(57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). A method of controlling a network comprising a transmission/reception point (TRP) 10 and a user equipment (UE) 20 is provided. Channel measurements related to a first antenna port 13A and a second antenna port 13B are performed by the UE 20. A quasi co-location (QCL) of the first antenna port 13A and the second antenna port 13B is determined, based at least in part on the channel measurements. A network configuration is adjusted, based at least in part on the determined QCL.

20 Claims, 10 Drawing Sheets

(58) Field of Classification Search
USPC .................................................. 375/267, 260
See application file for complete search history.

(56) References Cited

U.S. PATENT DOCUMENTS

| | | | |
|---|---|---|---|
| 2014/0119266 A1 | 5/2014 | Ng et al. | |
| 2015/0201369 A1 | 7/2015 | Ng et al. | |
| 2015/0289235 A1 | 10/2015 | Park et al. | |
| 2017/0005764 A1* | 1/2017 | Park | H04L 5/0051 |
| 2017/0223667 A1* | 8/2017 | Yi | H04W 4/06 |
| 2019/0239109 A1* | 8/2019 | Kim | H04L 5/0048 |
| 2019/0364556 A1* | 11/2019 | Davydov | H04L 5/005 |
| 2020/0162228 A1* | 5/2020 | Gao | H04W 72/0446 |

FOREIGN PATENT DOCUMENTS

| | | |
|---|---|---|
| WO | 2014/129716 A1 | 8/2014 |
| WO | 2016/186378 A1 | 11/2016 |
| WO | 2018/038872 A1 | 3/2018 |

OTHER PUBLICATIONS

Qualcomm Incorporated, "Discussion on QCL", 3GPP TSG RAN WG1 #88bis, Apr. 3-7, 2017, R1-1705596, 3 pages.
Huawei et al., "Details of QCL assumptions and related RS design considerations", 3GPP TSG RAN WG1 Meeting 188, Feb. 13-17, 2017, R1-1701697, 5 pages.
CATT, "E-PDCCH starting symbol configuration", 3GPP TSG RAN WG1 Meeting #71, Nov. 12-16, 2012, R1-124764, 3 pages.
Qualcomm Incorporated, "Discussion on QCL", 3GPP TSG RAN WG1 #88, Feb. 13-17, 2017, R1-1702619, 3 pages.
Office Action dated Dec. 16, 2019 in connection with United Kingdom Patent Application No. GB1712852.1, 4 pages.
International Search Report dated Nov. 22, 2018 in connection with International Patent Application No. PCT/KR2018/009219, 6 pages.
Written Opinion of the International Searching Authority dated Nov. 22, 2018 in connection with International Patent Application No. PCT/KR2018/009219, 5 pages.

* cited by examiner

[Fig. 1]
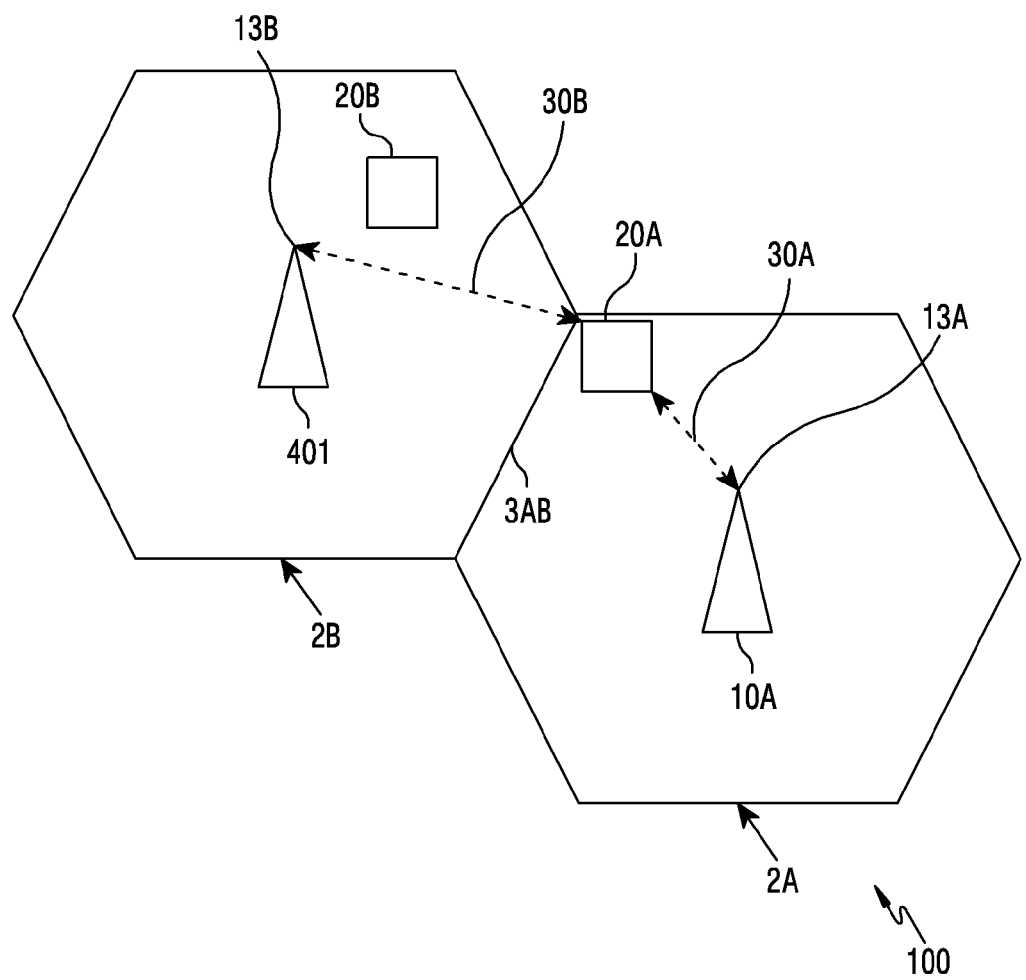

[Fig. 2]
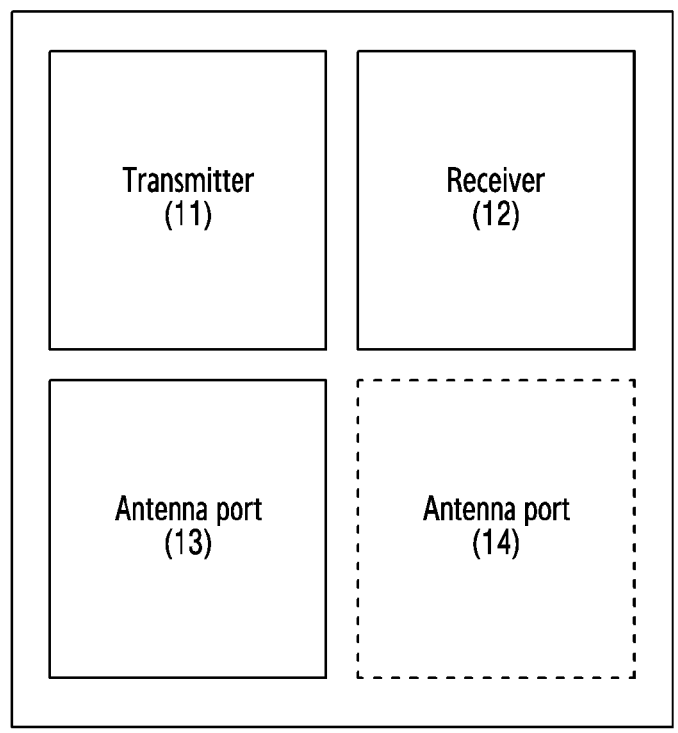

[Fig. 3]
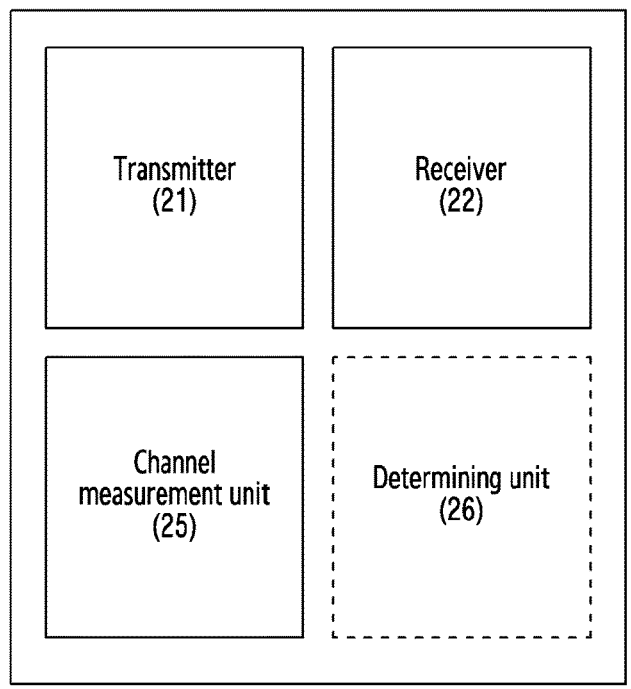
[Fig. 4]
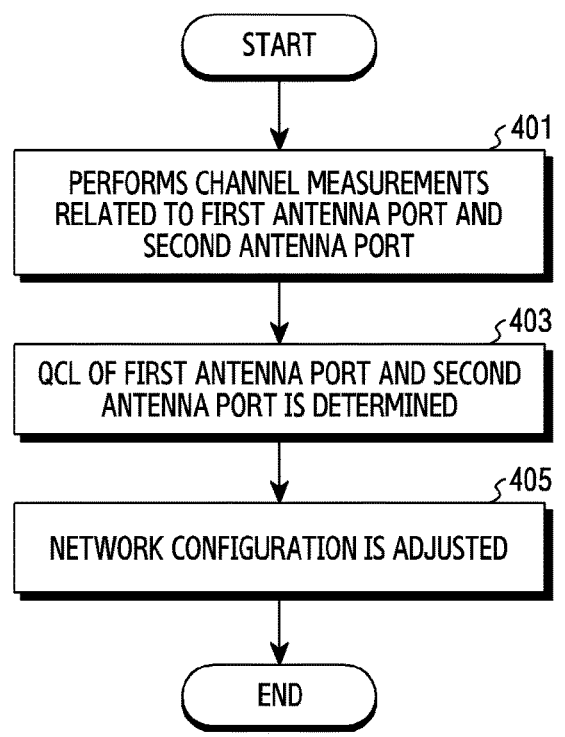

[Fig. 5]
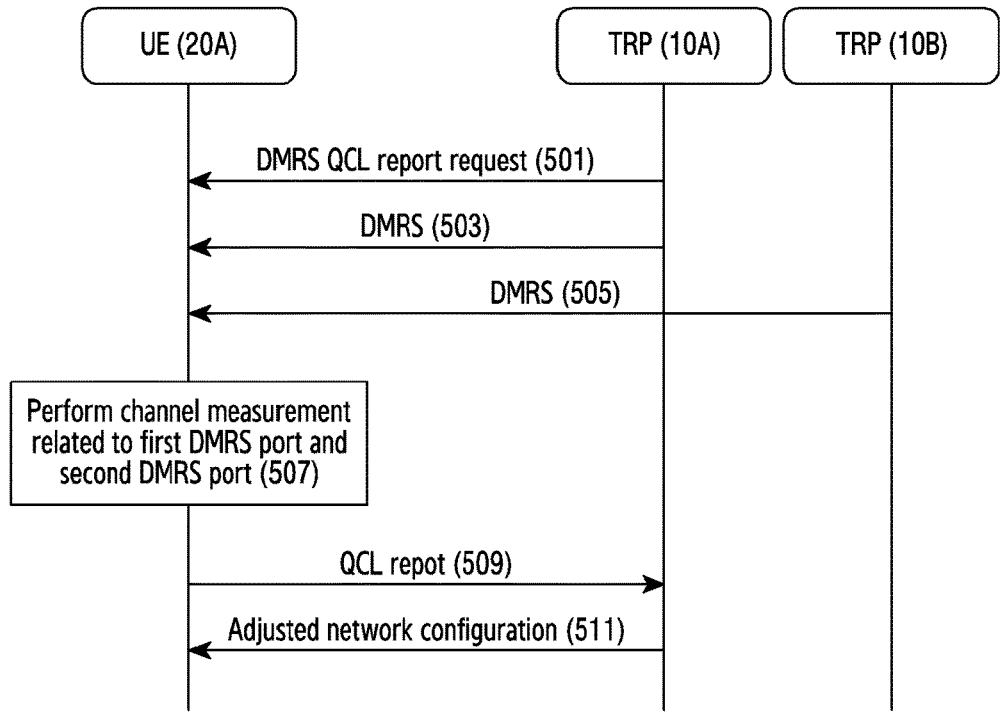
[Fig. 6]
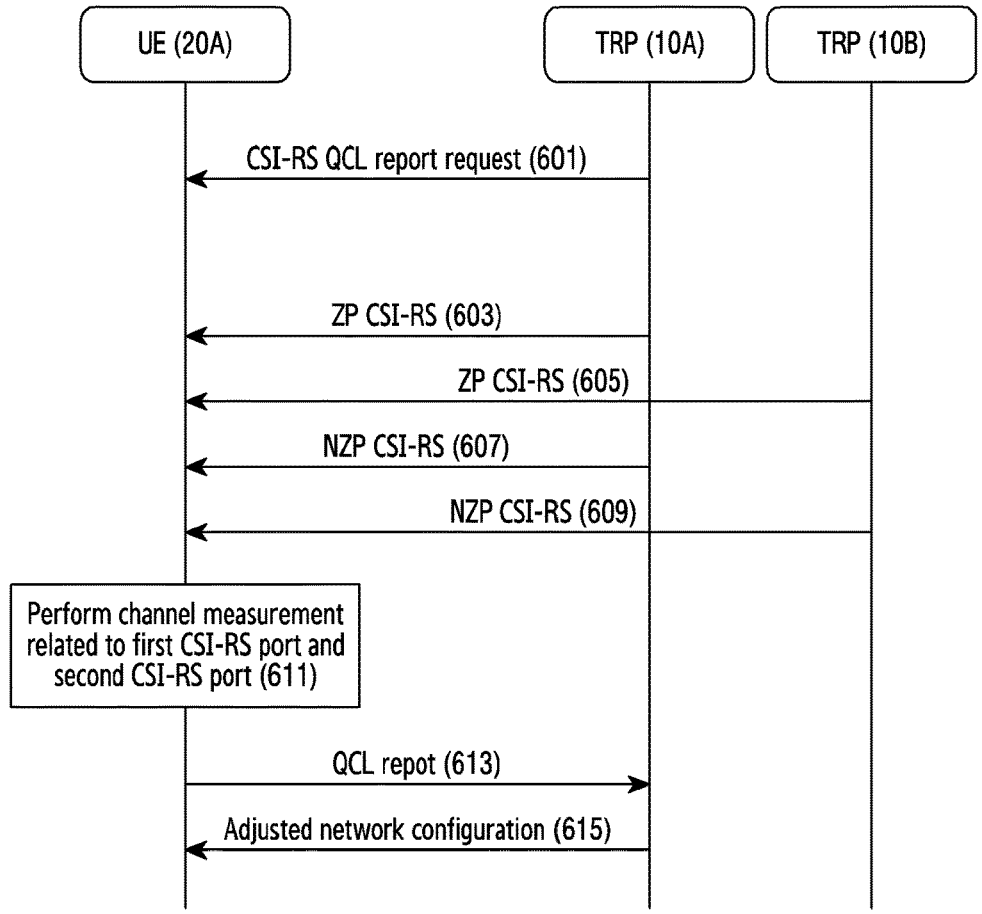

[Fig. 7]
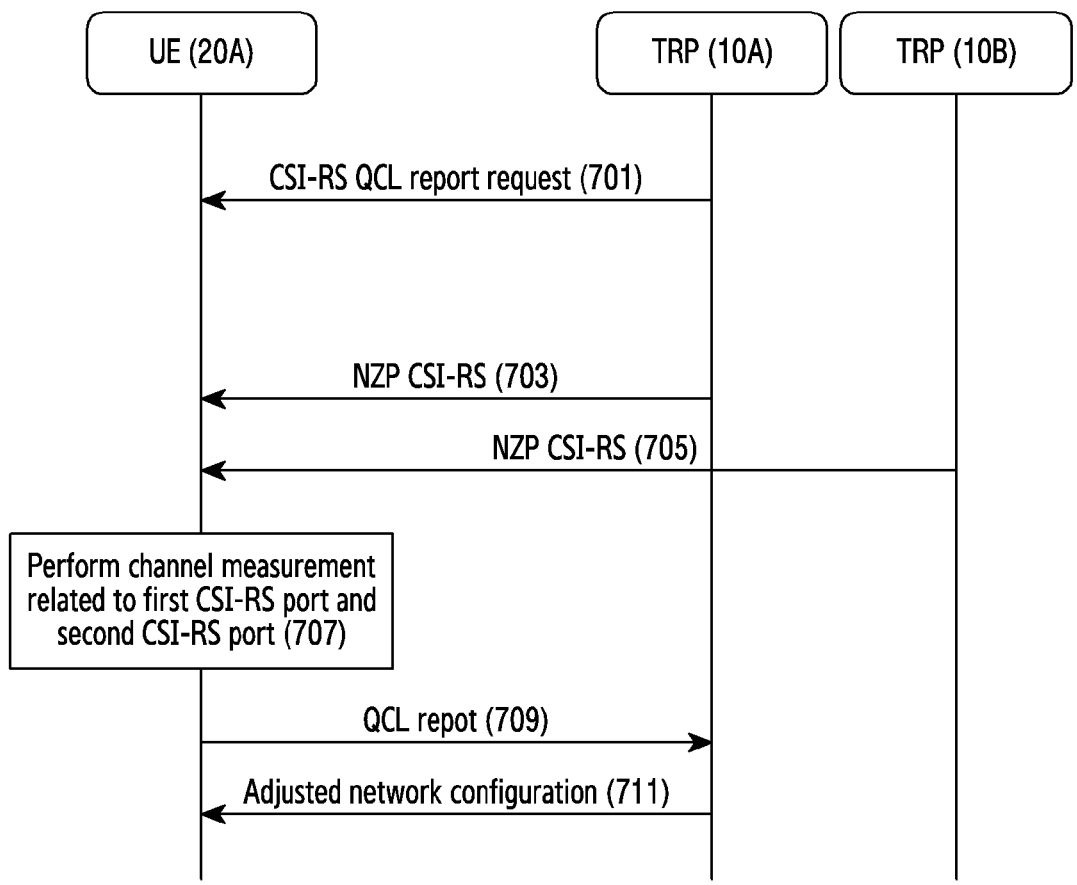

[Fig. 8]
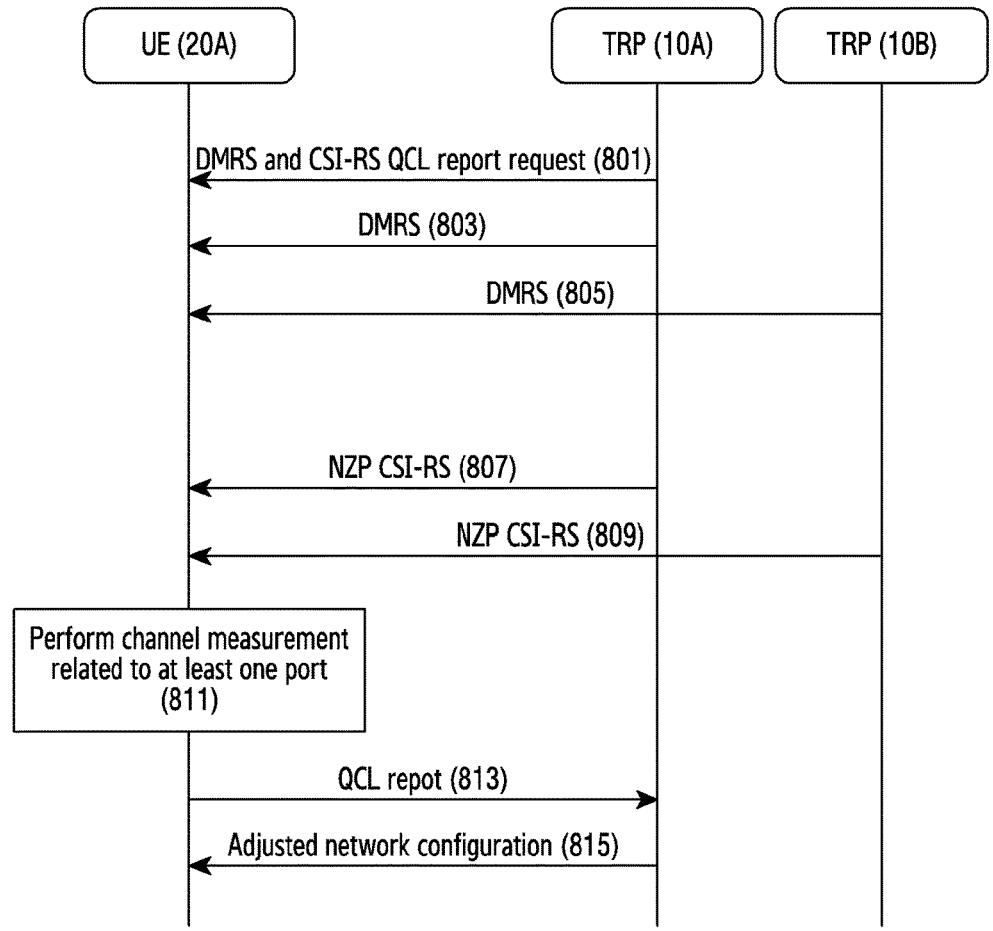
[Fig. 9]
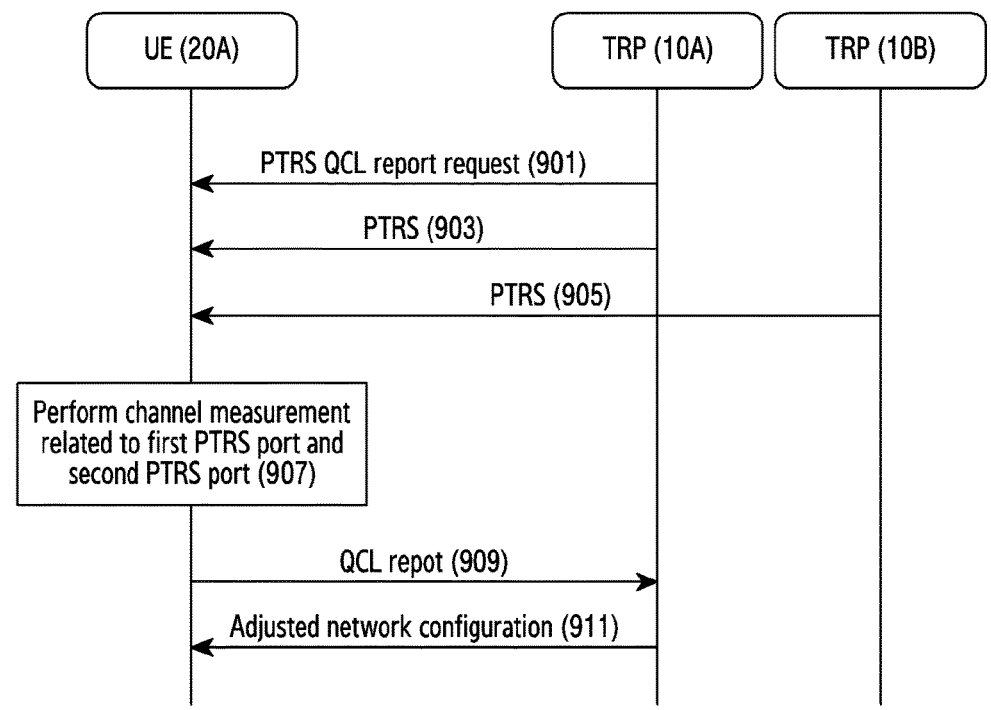

[Fig. 10]
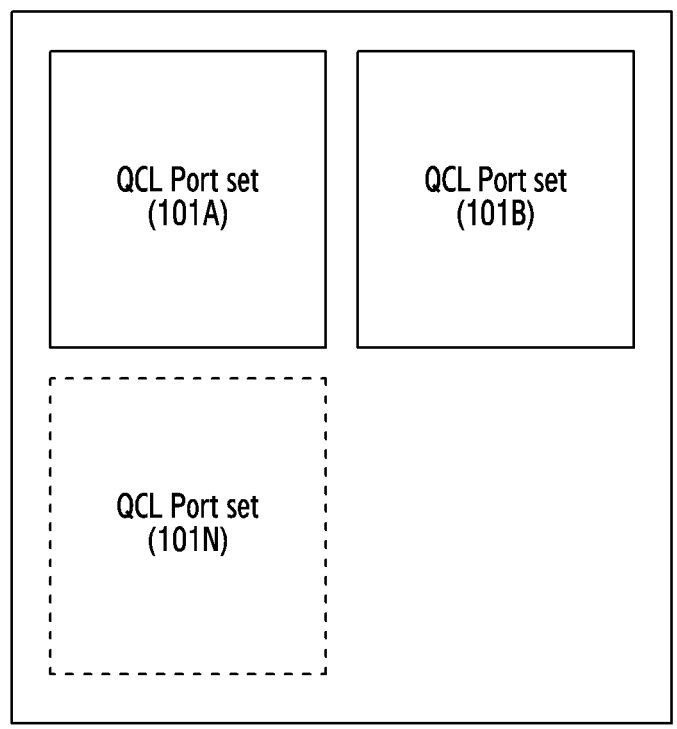

[Fig. 11]
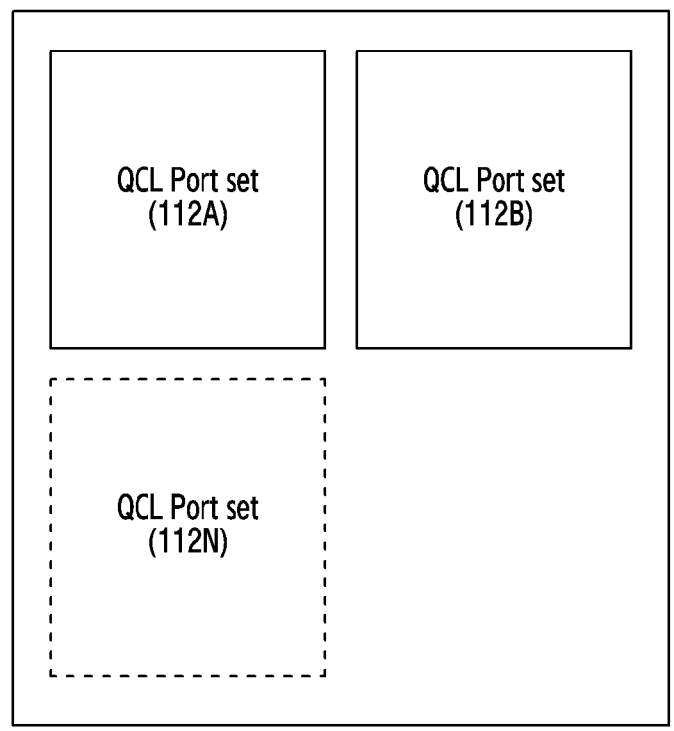
1100

[Fig. 12]
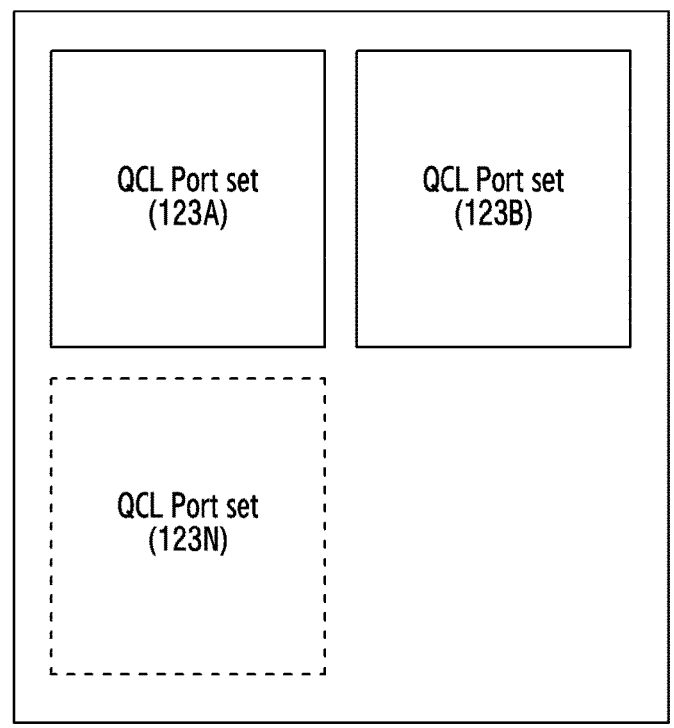

[Fig. 13]
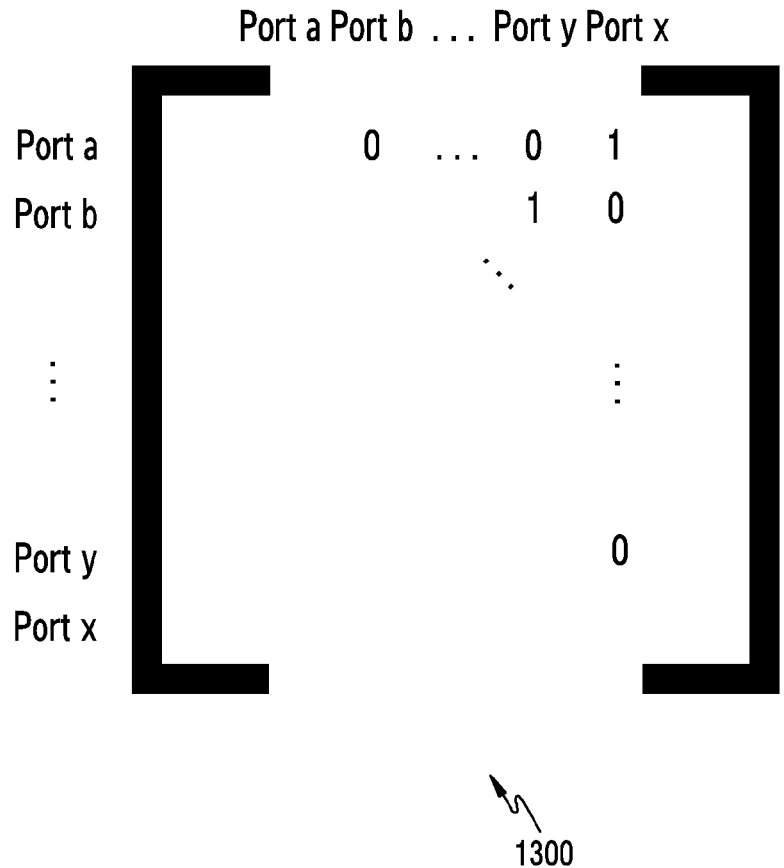
[Fig. 14]
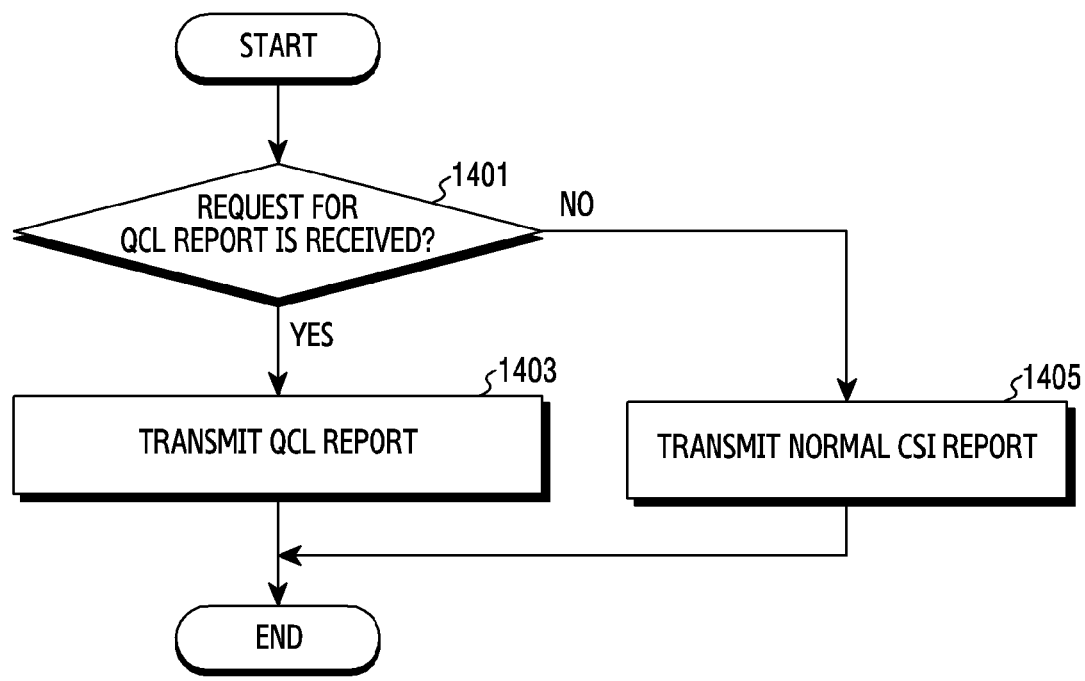

APPARATUS AND METHOD FOR DETERMINING NETWORK CONFIGURATION IN WIRELESS COMMUNICATION SYSTEM

CROSS-REFERENCE TO RELATED APPLICATIONS

This application is a 371 of International Application No. PCT/KR2018/009219 filed on Aug. 10, 2018, which claims priority to United Kingdom Patent Application No. 1712852.1 filed on Aug. 10, 2017, the disclosures of which are herein incorporated by reference in their entirety.

BACKGROUND

1. Field

The present disclosure relates to controlling networks, such as cellular networks. In particular, the present disclosure relates to adjusting network configurations based at least in part on quasi co-locations (QCLs) of antenna ports.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

A user equipment (UE) may receive data transmitted by a plurality of transmission/reception points (TRPs) (also known as transception points) in cellular networks (also known as mobile networks). For example, due to movement, rotation and/or blocking of a UE, the UE may receive data from a different TRP. Coordinated multi-point (CoMP) technology provides for UEs receiving data transmitted by the plurality of TRPs. Quasi co-location (QCL) of antenna ports, for example, is relevant to LTE and new radio (NR) CoMP. For example, if two antenna ports are QCL, these two antenna ports share similar large-scale channel properties including one or more of: average delay, delay spread, Doppler spread, Doppler shift, average gain and spatial parameters. Generally, the networks assume which antenna ports are QCL, as typically determined according to geo-locations of the antenna ports. The networks inform the UEs which antenna ports are QCL, for example via downlink control signalling (DCI).

There is a need to improve control of networks, for example cellular networks, so as to support an increased number and/or number density of TRPs and/or UEs while maintaining and/or improving system performance and/or QoS.

SUMMARY

It is one aim of the present disclosure, amongst others, to provide a method of controlling a network which at least partially obviates or mitigates at least some of the disadvantages of the prior art, whether identified herein or elsewhere. For example, the present disclosure may provide a method of controlling a network so as to support an increased number and/or number density of TRPs and/or UEs while maintaining and/or improving system performance and/or QoS.

In one example, there is provided a method of controlling a network comprising a first transmission/reception point (TRP) and a first user equipment (UE), the method comprising, performing, by the first UE, channel measurements related to a first antenna port and a second antenna port, determining, based at least in part on the channel measurements, a quasi co-location (QCL) of the first antenna port and the second antenna port, and adjusting a network configuration based at least in part on the determined QCL.

In one example, there is provided a system comprising a first TRP and a first UE, wherein the first UE is arranged to perform channel measurements related to a first antenna port and a second antenna port, wherein the system is arranged to determine, based at least in part on the channel measurements, a QCL of the first antenna port and the second antenna port, and adjust a network configuration based at least in part on the determined QCL.

In one example, there is provided a TRP arranged to communicate with a UE, wherein the TRP device is further arranged to adjust a network configuration based, at least in part, on a QCL of a first antenna port and a second antenna port, wherein the QCL is determined based, at least in part, on channel measurements related to the first antenna port and the second antenna port performed by the UE.

In one example, there is provided a UE arranged to communicate with a TRP, wherein the UE is further arranged to perform channel measurements related to a first antenna port and a second antenna port, such that a network configuration is adjustable based, at least in part, on a QCL of the first antenna port and the second antenna port determined based, at least in part, on the channel measurements performed by the UE.

In one example, there is provided a tangible non-transient computer-readable storage medium having recorded thereon instructions which when implemented by a first TRP and/or a first UE, cause the first TRP and/or the first UE to perform a method of controlling a network comprising the first TRP and the first UE, to perform any of the methods as set forth herein.

Various embodiments of the present disclosure provide a network configuration determination scheme that is more effective.

BRIEF DESCRIPTION OF THE DRAWINGS

For a better understanding of the invention, and to show how exemplary embodiments of the same may be brought into effect, reference will be made, by way of example only, to the accompanying diagrammatic Figures, in which:

FIG. 1 schematically depicts a system according to an exemplary embodiment;

FIG. 2 schematically depicts a transmission/reception point (TRP);

FIG. 3 schematically depicts a user equipment (UE);

FIG. 4 schematically depicts a method according to an exemplary embodiment;

FIG. 5 schematically depicts a method according to an exemplary embodiment;

FIG. 6 schematically depicts a method according to an exemplary embodiment;

FIG. 7 schematically depicts a method according to an exemplary embodiment;

FIG. 8 schematically depicts a method according to an exemplary embodiment;

FIG. 9 schematically depicts a method according to an exemplary embodiment;

FIG. 10 schematically depicts a quasi co-location (QCL) report according to an exemplary embodiment;

FIG. 11 schematically depicts a quasi co-location (QCL) report according to an exemplary embodiment;

FIG. 12 schematically depicts a quasi co-location (QCL) report according to an exemplary embodiment;

FIG. 13 schematically depicts a quasi co-location (QCL) report according to an exemplary embodiment; and FIG. 14 schematically depicts a part of a method according to an exemplary embodiment.

DETAILED DESCRIPTION

Hereinafter, in various embodiments of the present disclosure, hardware approaches will be described as an example. However, various embodiments of the present disclosure include a technology that uses both hardware and software and thus, the various embodiments of the present disclosure may not exclude the perspective of software.

Throughout this specification, the term "comprising" or "comprises" means including the component(s), unit(s), module(s), feature(s) or integer(s) specified but not to the exclusion of the presence of other components, units, modules, features or integers.

The term "consisting of" or "consists of" means including the component(s), unit(s), module(s), feature(s) or integer(s) specified but excluding other components, units, modules, features or integers.

Whenever appropriate, depending upon the context, the use of the term "comprises" or "comprising" may also be taken to include the meaning "consists essentially of" or "consisting essentially of", and also may also be taken to include the meaning "consists of" or "consisting of".

The optional features set out herein may be used either individually or in combination with each other where appropriate and particularly in the combinations as set out in the accompanying claims. The optional features for each aspect or exemplary embodiment of the invention, as set out herein are also applicable to all other aspects or exemplary embodiments of the invention, where appropriate. In other words, the skilled person reading this specification should consider the optional features for each aspect or exemplary embodiment of the invention as interchangeable and combinable between different aspects and exemplary embodiments.

According to the present disclosure, there is provided a method of as set forth in the appended claims. Also provided is a transmission/reception point (TRP), a user equipment (UE), a system comprising a TRP and a UE, and a computer-readable storage medium. Other features of the invention will be apparent from the dependent claims, and the description that follows.

FIG. 1 schematically depicts a system 100 according to an exemplary embodiment.

Referring to FIG. 1, the system 100 includes a first transmission/reception point (TRP) 10A and a first user equipment (UE) 20A. The first UE 20A is arranged to perform channel measurements related to a first antenna port 13A and a second antenna port 13B. The system 100 is arranged to determine, based at least in part on the channel measurements, a quasi co-location (QCL) of the first antenna port 13A and the second antenna port 13B. The system 100 is arranged to adjust a network configuration based at least in part on the determined QCL. Herein, the first TRP 10A may be referred as a 'base station'.

In this way, the QCL of the first antenna port and the second antenna port is determined based at least in part on the channel measurements performed by the first UE, and the network configuration adjusted accordingly. In this way, system performance and/or QoS may be maintained and/or improved. Determining the QCL according to this method may, for example, complement, improve and/or supersede conventional QCL determination, such as via geo-locations of the first antenna port and the second antenna port. In this way, an increased number and/or number density of TRPs and/or UEs may be supported while maintaining and/or improving system performance and/or QoS.

In more detail, the first TRP 10A comprises the first antenna port 13A and the second TRP 10B comprises the second antenna port 13B. The first TRP 10A defines a first cell 2A. The second TRP 10B similarly defines a second cell 2B. The first cell 2A and the second cell 2B are adjacent, having a boundary 3AB.

FIG. 2 schematically depicts a TRP 10.

Referring to FIG. 2, the TRP 10, for example the first TRP 10A and/or the second TRP 10B, is arranged to communicate with a UE 20, for example the first UE 20A and/or the second user device 20B. The TRP 10 is further arranged to adjust a network configuration based, at least in part, on a QCL of a first antenna port and a second antenna port, wherein the QCL is determined based, at least in part, on channel measurements related to the first antenna port and the second antenna port performed by the UE 10.

In more detail, the TRP 10 comprises a transmitter 11 and a receiver 12. The TRP 10 further comprises an antenna port 13, for example the first antenna port 13A or the second antenna port 13B. Herein, the transmitter 11 and the receiver 12 may be implemented as an element (e.g., transceiver).

The UE 20 may be arranged to perform the channel measurements on a first reference signal and a second reference signal received by the UE 20. The network may be arranged to transmit the first reference signal and the second reference signal. For example, the TRP 10 may be arranged to transmit the first reference signal and/or the second reference signal. The network may be arranged to transmit the first reference signal and the second reference signal via the first antenna port and the second antenna port respectively. For example, the TRP 10 may be arranged to transmit the first reference signal and/or the second reference signal via the first antenna port and/or the second antenna port respectively. The TRP 10 may comprise the first antenna port and/or the second antenna port. The TRP 10 may comprise a plurality of first antenna ports and/or a plurality of second antenna ports. The first TRP 10 and a second TRP 10 may be arranged to transmit the first reference signal and the second reference signal respectively. The first TRP 10 and a second TRP 10 may be arranged to transmit the first reference signal and the second reference signal via a first antenna panel and a second antenna panel respectively. The TRP 10 may comprise the first antenna panel and/or the second antenna panel. The TRP 10 may comprise a plurality of first antenna panels and/or a plurality of second antenna panels. The first antenna panel may comprise the first antenna port and/or the second antenna port. The second antenna panel may comprise the first antenna port and/or the second antenna port. The TRP 10 may comprise the first antenna port and the second TRP may comprise the second antenna port. The TRP 10 may comprise the first antenna panel comprising the first antenna port and the second TRP may comprise the second antenna panel comprising the second antenna port. The TRP 10 may be arranged to transmit the first reference signal and the second reference signal via the first antenna panel and the second antenna panel respectively. The TRP 10 and the second TRP may be respectively arranged to transmit the first reference signal and the second reference signal via the first antenna panel and the second antenna panel respectively. The first reference signal and/or the second reference signal may comprise a demodulation reference signal (DMRS). The first reference signal and/or the second reference signal may comprise a channel state information reference signal (CSI-RS). The first reference signal and/or the second reference signal may comprise a phase tracking reference signal (PTRS). The TRP 10 may be arranged to transmit a request to the UE to perform, by the first UE, channel measurements related to the first antenna port and the second antenna port. The TRP 10 may be arranged to receive a QCL report transmitted by the TRP. The TRP 10 may be arranged to receive the QCL report via a channel state information (CSI) report. The TRP 10 may be arranged to receive the QCL report via the CSI report via a physical uplink control channel (PUCCH) and/or a physical uplink shared channel (PUSCH). The TRP 10 may be arranged to transmit a request for the QCL report to the UE. The QCL report may comprise port, beam and/or resource information. The TRP 10 may be arranged to adjust the network configuration based on the QCL report. For example, the TRP 10 may comprise an optional network configuration unit 14, arranged to adjust the network configuration based on the QCL report. The TRP 10 may be arranged to adjust the network configuration by adjusting a transmission coordination scheme and/or a network coordination scheme. The TRP 10 may be arranged to inform the UE 10 and/or another UE and/or a second TRP 10, the adjusted network configuration.

FIG. 3 schematically depicts a UE 20.

Referring to FIG. 3, the UE 20, for example the first UE 20A and/or the second user device 20B, is arranged to communicate with a TRP 10, for example the first TRP 10A and/or the second TRP 10B. The UE 20 is further arranged to perform channel measurements related to a first antenna port and a second antenna port such that a network configuration is adjustable based, at least in part, on a quasi co-location (QCL) of the first antenna port and the second antenna port determined based, at least in part, on the channel measurements performed by the UE 20.

In more detail, the UE 20 comprises a transmitter 21 and a receiver 22. The UE 20 also comprises a channel measurement unit 25, arranged to perform channel measurements related to the first antenna port and the second antenna port, and, optionally, a determining unit 26. Herein, the transmitter 21 and the receiver 22 may be implemented as an element (e.g., transceiver). Further, the channel measurement unit 25 and the determining unit 25 may be implemented as at least one element (e.g., at least one processor).

The UE 20 may be arranged to perform the channel measurements on a first reference signal and a second reference signal received by the UE 20. The UE 20 may be arranged to receive the first reference signal and the second reference signal transmitted by the network. The first reference signal and the second reference signal may be transmitted via the first antenna port and the second antenna port respectively. The first reference signal and the second reference signal may be transmitted by the TRP and a second TRP respectively. The first reference signal and the second reference signal may be transmitted via a first antenna panel and a second antenna panel respectively. In one example, the first reference signal and the second reference signal are transmitted by the TRP via the first antenna panel and the second antenna panel respectively. The first reference signal and the second reference signal may be transmitted by the TRP and by a second TRP respectively, via the first antenna panel and the second antenna panel respectively. The first reference signal and/or the second reference signal may comprise a demodulation reference signal (DMRS). The first reference signal and/or the second reference signal may comprise a channel state information reference signal (CSI-RS). The first reference signal and/or the second reference signal may comprise a phase tracking reference signal (PTRS). The UE 20 may arranged to determine, based at least in part on the channel measurements, the QCL of the first antenna port and the second antenna port. The UE 20 may optionally comprise the determining unit 26 arranged to determine, based at least in part on the channel measurements, the QCL of the first antenna port and the second antenna port. The UE 20 may be arranged to perform the channel measurements related to the first antenna port and the second antenna port responsive to a request received by the UE 20. The request may be transmitted by the TRP. The UE 20 may be arranged to establish the QCL report. The UE 20 may optionally comprise an establishing unit (not shown) arranged to establish the QCL report. The UE 20 may be arranged to transmit the QCL report to the first TRP. The UE 20 may be arranged to transmit the QCL report to the first TRP via a channel state information (CSI) report. The UE 20 may be UE is arranged to transmit the QCL report to the first TRP via the CSI report via a physical uplink control channel (PUCCH) and/or a physical uplink shared channel (PUSCH). The UE 20 may be arranged to receive a request for the QCL report transmitted, for example, by the TRP. The QCL report may comprise port, beam and/or resource information. The network configuration may be adjusted based on the QCL report, for example, by the network and/or by the TRP. The network configuration adjustment may comprise adjusting a transmission coordination scheme and/or a network coordination scheme. The UE 20 may be arranged to be informed of the adjusted network configuration, for example, the UE is arranged to receive the adjusted network configuration. That is, the adjusted network configuration may be explicitly communicated. The UE 20 may be arranged to assume the adjusted network configuration. That is, the adjusted network configuration may be implicitly communicated.

FIG. 4 schematically depicts a method according to an exemplary embodiment. The method is of controlling a network comprising a first TRP and a UE.

Referring to FIG. 4, at step 401, the first UE performs channel measurements related to a first antenna port and a second antenna port. At step 403, based at least in part on the channel measurements, a QCL of the first antenna port and the second antenna port is determined. At step 405, a network configuration is adjusted, based at least in part on the determined QCL.

The method may include any of the steps described herein.

The performing the channel measurements may be on a first reference signal and a second reference signal received by the first UE. The method may comprise transmitting the first reference signal and the second reference signal by the network. The method may comprise transmitting the first reference signal and the second reference signal via the first antenna port and the second antenna port respectively. The first reference signal and the second reference signal may be transmitted by the first TRP and a second TRP respectively. The method may comprise transmitting the first reference signal and the second reference signal via a first antenna panel and a second antenna panel respectively. The method may comprise transmitting, by the first TRP, the first reference signal and the second reference signal via the first antenna panel and the second antenna panel respectively. The method may comprise transmitting, by the first TRP and by the second TRP respectively, the first reference signal and the second reference signal via the first antenna panel and the second antenna panel respectively. The first reference signal and/or the second reference signal may comprise a demodulation reference signal (DMRS). The first reference signal and/or the second reference signal may comprise a channel state information reference signal (CSI-RS). The first reference signal and/or the second reference signal may comprise a phase tracking reference signal (PTRS).

The determining, based at least in part on the channel measurements, the QCL of the first antenna port and the second antenna port may be performed by first UE. The performing, by the first UE, channel measurements related to the first antenna port and the second antenna port may be responsive to a request received by the first UE. The method may comprise transmitting, by the first TRP, the request. The method may comprise establishing a QCL report. The method may comprise establishing the QCL report by the first UE. The method may comprise transmitting the QCL report to the first TRP. The method may comprise transmitting, by the first UE, the QCL report to the first TRP. The method may comprise transmitting, by the first UE, the QCL report to the first TRP via a channel state information (CSI) report. The method may comprise transmitting, by the first UE, the QCL report to the first TRP via the CSI report via a physical uplink control channel (PUCCH) and/or a physical uplink shared channel (PUSCH). The method may comprise transmitting, by the first TRP request, a request for the QCL report to the first UE. The QCL report may comprises port, beam and/or resource information. The adjusting the network configuration may be based on the QCL report.

The adjusting the network configuration may comprise adjusting a transmission coordination scheme and/or a network coordination scheme. The method may comprise informing, by the network to the first UE and/or a second UE and/or a second TRP, the adjusted network configuration. The method may comprise assuming, by the first UE and/or a second UE and/or a second TRP, the adjusted network configuration.

FIG. 5 schematically depicts a method according to an exemplary embodiment. Particularly, FIG. 5 schematically depicts the method comprising a DMRS QCL report request and a QCL report. A DMRS QCL report comprises and/or is a report indicating which DMRS ports are QCL.

Referring to FIG. 5, at step 501, a serving TRP 10A (i.e. a first TRP) transmits a DMRS QCL report request to a UE 20A (i.e. a first UE).

At step 503, the serving TRP 10A transmits a first DMRS on a first DMRS port (i.e. a first antenna port) to the UE 20A such that the UE 20A may estimate a channel coefficient and/or a plurality of channel coefficients for the TRP 10A.

At step 505, a coordinating TRP 10B (i.e. a second TRP) transmits a second DMRS on a second DMRS port (i.e. a second antenna port), different to the first DMRS port, to the UE 20A such that the UE 20A may estimate a channel coefficient for the coordinating TRP 10B. A plurality of coordinating TRPs (i.e. a plurality of second TRPs 20) may transmit respectively a plurality of second DMRSs on a plurality of second DMRS ports (i.e. a plurality of second antenna ports), different to the first DMRS port, to the UE 20A such that the UE 20A may estimate a plurality of channel coefficients for the coordinating TRPs 20 respectively.

At step 507, the UE 20A performs channel measurements related to the first DMRS port and the second DMRS port. The UE 20A determines, based at least in part on the channel measurements, a QCL of the first DMRS port and the second DMRS port. If the plurality of coordinating TRPs transmit respectively the plurality of second DMRSs on the plurality of second DMRS ports, the UE groups 20A these DMRS ports into a collection of sets, where each set contains DMRS ports which are QCL. The UE 20A establishes a QCL report including the results of the determination, for example, the collection of sets.

At step 509, the UE 20A transmits the QCL report to the serving TRP 10A.

At step 511, the serving TRP 10A adjusts a network configuration based at least in part on the determined QCL, particularly based at least in part on the QCL report. The serving TRP 10A informs the UE 20A of the adjusted network configuration, for example the QCL configuration.

In other words, this method of DMRS QCL reporting starts with the serving TRP transmitting a DMRS QCL report request to the UE. Then, the serving TRP and coordinating TRPs transmit DMRSs on different DMRS ports to the UE such that the UE can estimate channel coefficients from each TRP. Next, the UE groups these DMRS ports into a collection of sets, where each set contains DMRS ports which are QCL. Next, the UE forms a report of this collection and transmit the report to the serving cell. According to the UE's QCL report, the serving cell can update the QCL configuration.

FIG. 6 schematically depicts a method according to an exemplary embodiment. Particularly, FIG. 6 schematically depicts the method comprising a CSI-RS QCL report request and a QCL report. A CSI-RS QCL report comprises and/or is a report indicating which CSI-RS ports are QCL.

Referring to FIG. 6, at step 601, a serving TRP 10A (i.e. a first TRP) transmits a CSI-RS QCL report request to a UE 20A (i.e. a first UE).

At step 603, the serving TRP 10A transmits a first zero power (ZP) CSI-RS on a first CSI-RS port (i.e. a first antenna port) to the UE 20A such that the UE 20A may estimate a channel coefficient and/or a plurality of channel coefficients for a coordinating TRP 10B (i.e. a second TRP).

At step 605, the coordinating TRP 10B transmits another first ZP CSI-RS on another first CSI-RS port (i.e. another first antenna port), different to the first ZP CSI-RS port, to the UE 20A such that the UE 20A may estimate a channel coefficient for the serving TRP 10A. A plurality of coordinating TRPs (i.e. a plurality of second TRPs 20) may transmit respectively a plurality of ZP CSI-RSs on a plurality of first CSI-RS ports, different to the first CSI-RS port, to the UE 20A such that the UE 20A may estimate a plurality of channel coefficients for each of the coordinating TRPs 20 respectively. Alternatively, the ZP CSI-RS may not be used for estimation of the channel coefficient. For example, orthogonal NZP CSI-RSs.

At step 607, the serving TRP 10A transmits a first NZP CSI-RS on a second CSI-RS port (i.e. a second antenna port) to the UE 20A such that the UE 20A may estimate a channel coefficient and/or a plurality of channel coefficients for the TRP 10A.

At step 609, the coordinating TRP 10B transmits another second NZP CSI-RS on another second CSI-RS port (i.e. another second antenna port), different to the second ZP CSI-RS port, to the UE 20A such that the UE 20A may estimate a channel coefficient for the coordinating TRP 10B. A plurality of coordinating TRPs (i.e. a plurality of second TRPs 20) may transmit respectively a plurality of non-ZP CSI-RSs on a plurality of second CSI-RS ports, different to the second CSI-RS ports, to the UE 20A such that the UE 20A may estimate a plurality of channel coefficients for each of the coordinating TRPs 20 respectively.

At step 611, the UE 20A performs channel measurements related to the first CSI-RS port and the second CSI-RS port, for example the NZP CSI-RS ports. The UE 20A determines, based at least in part on the channel measurements, a QCL of the first CSI-RS port and the second CSI-RS port. If the plurality of coordinating TRPs transmit respectively the plurality of CSI-RSs on the plurality of first and second CSI-RS ports, the UE groups 20A these CSI-RS ports into a collection of sets, where each set contains CSI-RS ports which are QCL. The UE 20A establishes a QCL report including the results of the determination, for example, the collection of sets.

At step 613, the UE 20A transmits the QCL report to the serving TRP 10A. At step 615, the serving TRP 10A adjusts a network configuration based at least in part on the determined QCL, particularly based at least in part on the QCL report. The serving TRP 10A informs the UE 20A of the adjusted network configuration, for example the QCL configuration.

In other words, this method of CSI-RS QCL reporting starts with the serving TRP transmitting a CSI-RS QCL report request to the UE. Then, the serving TRP and coordinating TRPs transmit both ZP CSI-RSs and NZP CSI-RSs on different CSI-RS ports to the UE such that the UE can estimate channel coefficients from each TRP. Next, the UE groups these CSI-RS ports into a collection of sets, where each set contains CSI-RS ports which are QCL. Next, the UE forms a report of this collection and transmits the report to the serving cell. According to the UE's QCL report, the serving cell can update the QCL configuration.

FIG. 7 schematically depicts a method according to an exemplary embodiment. Particularly, FIG. 7 schematically depicts the method comprising a CSI-RS QCL report request and a QCL report. A CSI-RS QCL report comprises and/or is a report indicating which CSI-RS ports are QCL.

Referring to FIG. 7, at step 701, a serving TRP 10A (i.e. a first TRP) transmits a CSI-RS QCL report request to a UE 20A (i.e. a first UE).

At step 703, the serving TRP 10A transmits a first NZP CSI-RS on a first CSI-RS port (i.e. a first antenna port) to the UE 20A such that the UE 20A may estimate a channel coefficient and/or a plurality of channel coefficients for the TRP 10A.

At step 705, a coordinating TRP 10B (i.e. a second TRP) transmits another second NZP CSI-RS on another second CSI-RS port (i.e. another second antenna port) to the UE 20A such that the UE 20A may estimate a channel coefficient for the coordinating TRP 10B. A plurality of coordinating TRPs (i.e. a plurality of second TRPs 20) may transmit respectively a plurality of non-ZP CSI-RSs on a plurality of second CSI-RS ports, different to the second CSI-RS ports, to the UE 20A such that the UE 20A may estimate a plurality of channel coefficients for each of the coordinating TRPs 20 respectively.

At step 707, the UE 20A performs channel measurements related to the first CSI-RS port and the second CSI-RS port, for example the NZP CSI-RS ports. The UE 20A determines, based at least in part on the channel measurements, a QCL of the first CSI-RS port and the second CSI-RS port. If the plurality of coordinating TRPs transmit respectively the plurality of CSI-RSs on the plurality of first and second CSI-RS ports, the UE groups 20A these CSI-RS ports into a collection of sets, where each set contains CSI-RS ports which are QCL. The UE 20A establishes a QCL report including the results of the determination, for example, the collection of sets.

At step 709, the UE 20A transmits the QCL report to the serving TRP 10A. At step 711, the serving TRP 10A adjusts a network configuration based at least in part on the determined QCL, particularly based at least in part on the QCL report. The serving TRP 10A informs the UE 20A of the adjusted network configuration, for example the QCL configuration.

In other words, this method of CSI-RS QCL reporting starts with the serving TRP transmitting a CSI-RS QCL report request to the UE. Then, the serving TRP and coordinating TRPs transmit CSI-RSs to the UE such that the UE can estimate channel coefficients from each TRP. These CSI-RSs are aggregated so that one CSI-RS configuration is enough for the mapping of multiple CSI-RS ports. Next, the UE groups these CSI-RS ports into a collection of sets, where each set contains CSI-RS ports which are QCL. Next, the UE forms a report of this collection and transmits the report to the serving cell. According to the UE's QCL report, the serving cell can update the QCL configuration.

FIG. 8 schematically depicts a method according to an exemplary embodiment. Particularly, FIG. 8 schematically depicts the method comprising a DMRS and CSI-RS QCL report request and a QCL report. A DMRS and CSI-RS QCL report comprises and/or is a report indicating which DMRS and CSI-RS ports are QCL.

Referring to FIG. 8, at step 801, a serving TRP 10A (i.e. a first TRP) transmits a DMRS and CSI-RS QCL report request to a UE 20A (i.e. a first UE).

At step 803, the serving TRP 10A transmits a first DMRS on a first DMRS port (i.e. a first antenna port) to the UE 20A such that the UE 20A may estimate a channel coefficient and/or a plurality of channel coefficients for the TRP 10A.

At step 805, a coordinating TRP 10B (i.e. a second TRP) transmits a second DMRS on a second DMRS port (i.e. a second antenna port), different to the first DMRS port, to the UE 20A such that the UE 20A may estimate a channel coefficient for the coordinating TRP 10B. A plurality of coordinating TRPs (i.e. a plurality of second TRPs 20) may transmit respectively a plurality of second DMRSs on a plurality of second DMRS ports (i.e. a plurality of second antenna ports), different to the first DMRS port, to the UE 20A such that the UE 20A may estimate a plurality of channel coefficients for the coordinating TRPs 20 respectively.

At step 807, the serving TRP 10A transmits a first NZP CSI-RS on a second CSI-RS port (i.e. a second antenna port) to the UE 20A such that the UE 20A may estimate a channel coefficient and/or a plurality of channel coefficients for the TRP 10A.

At step 809, the coordinating TRP 10B transmits another second NZP CSI-RS on another second CSI-RS port (i.e. another second antenna port) to the UE 20A such that the UE 20A may estimate a channel coefficient for the coordinating TRP 10B. A plurality of coordinating TRPs (i.e. a plurality of second TRPs 20) may transmit respectively a plurality of non-ZP CSI-RSs on a plurality of second CSI-RS ports, different to the second CSI-RS ports, to the UE 20A such that the UE 20A may estimate a plurality of channel coefficients for each of the coordinating TRPs 20 respectively.

At step 811, the UE 20A performs channel measurements related to the first DMRS port and the second DMRS port. The UE 20A determines, based at least in part on the channel measurements, a QCL of the first DMRS port and the second DMRS port. If the plurality of coordinating TRPs transmit respectively the plurality of second DMRSs on the plurality of second DMRS ports, the UE groups 20A these DMRS ports into a collection of sets, where each set contains DMRS ports which are QCL. The UE 20A establishes a QCL report including the results of the determination, for example, the collection of sets.

At step 811, additionally, the UE 20A performs channel measurements related to the first CSI-RS port and the second CSI-RS port, for example the NZP CSI-RS ports. The UE 20A determines, based at least in part on the channel measurements, a QCL of the first CSI-RS port and the second CSI-RS port. If the plurality of coordinating TRPs transmit respectively the plurality of CSI-RSs on the plurality of first and second CSI-RS ports, the UE groups 20A these CSI-RS ports into a collection of sets, where each set contains CSI-RS ports which are QCL. The UE 20A establishes a QCL report including the results of the determination, for example, the collection of sets.

At step 811 additionally, the UE 20A performs channel measurements related to a CSI-RS port, for example the first CSI-RS port and/or the second CSI-RS port, for example the NZP CSI-RS ports, and a DMRS port, for example the first DMRS port and/or the second DMRS port. The UE 20A determines, based at least in part on the channel measurements, a QCL of the CSI-RS port and the DMRS port. If the plurality of coordinating TRPs transmit respectively the plurality of CSI-RSs on the plurality of CSI-RS ports and the plurality of DMRSs on the plurality of DMRS ports, the UE groups 20A these CSI-RS and DMRS ports into a collection of sets, where each set contains CSI-RS ports and DMRS ports which are QCL. The UE 20A establishes a QCL report including the results of the determination, for example, the collection of sets.

A single QCL report, including the DMRS and the CSI-RS determinations, may be established. Alternatively and/or additionally, separate QCL reports may be established.

At step 813, the UE 20A transmits the QCL report(s) to the serving TRP 10A. At step 815, the serving TRP 10A adjusts a network configuration based at least in part on the determined QCL, particularly based at least in part on the QCL report. The serving TRP 10A informs the UE 20A of the adjusted network configuration, for example the QCL configuration.

In other words, this method of DMRS and CSI-RS QCL reporting starts with the serving TRP transmitting a DMRS and CSI-RS QCL report request to the UE. Then, the serving TRP and coordinating TRPs transmit DMRSs and NZP CSI-RSs to the UE such that the UE can estimate channel coefficients from each TRP. Next, the UE groups these DMRS and CSI-RS ports into a collection of sets, where each set contains DMRS and CSI-RS ports which are QCL. Next, the UE forms a report of this collection and transmits the report to the serving cell. According to the UE's QCL report, the serving cell can update the QCL configuration.

FIG. 9 schematically depicts a method according to an exemplary embodiment. Particularly, FIG. 9 schematically depicts the method comprising a PTRS QCL report request and a QCL report. A PTRS QCL report comprises and/or is a report indicating which PTRS ports are QCL.

Referring to FIG. 9, at step 901, a serving TRP 10A (i.e. a first TRP) transmits a PTRS QCL report request to a UE 20A (i.e. a first UE).

At step 903, the serving TRP 10A transmits a first PTRS on a first PTRS port (i.e. a first antenna port) to the UE 20A such that the UE 20A may estimate a channel coefficient and/or a plurality of channel coefficients for the TRP 10A.

At step 905, a coordinating TRP 10B (i.e. a second TRP) transmits a second PTRS on a second PTRS port (i.e. a second antenna port), different to the first PTRS port, to the UE 20A such that the UE 20A may estimate a channel coefficient for the coordinating TRP 10B. A plurality of coordinating TRPs (i.e. a plurality of second TRPs 20) may transmit respectively a plurality of second PTRSs on a plurality of second PTRS ports (i.e. a plurality of second antenna ports), different to the first PTRS port, to the UE 20A such that the UE 20A may estimate a plurality of channel coefficients for the coordinating TRPs 20 respectively.

At step 907, the UE 20A performs channel measurements related to the first PTRS port and the second PTRS port. The UE 20A determines, based at least in part on the channel measurements, a QCL of the first PTRS port and the second PTRS port. If the plurality of coordinating TRPs transmit respectively the plurality of second PTRSs on the plurality of second PTRS ports, the UE groups 20A these PTRS ports into a collection of sets, where each set contains PTRS ports which are QCL. The UE 20A establishes a QCL report including the results of the determination, for example, the collection of sets.

At step 909, the UE 20A transmits the QCL report to the serving TRP 10A. At step 911, the serving TRP 10A adjusts a network configuration based at least in part on the determined QCL, particularly based at least in part on the QCL report. The serving TRP 10A informs the UE 20A of the adjusted network configuration, for example the QCL configuration.

In other words, this method of PTRS QCL reporting starts with the serving TRP transmitting a PTRS QCL report request to the UE. Then, the serving TRP and coordinating TRPs transmit PTRSs on different PTRS ports to the UE such that the UE can estimate channel coefficients from each TRP. Next, the UE group these PTRS ports into a collection of sets, where each set contains PTRS ports which are QCL. Next, the UE forms a report of this collection and transmits the report to the serving cell. According to the UE's QCL report, the serving cell can update the QCL configuration.

FIGS. 10 to 12 schematically depict QCL reports according to exemplary embodiment. Different reports and/or report formats may be provided to satisfy different channel conditions or feedback overhead requirements.

FIG. 10 schematically depicts a QCL report 1000 according to an exemplary embodiment. Particularly, FIG. 10 schematically depicts the port-level QCL report 1000 having Format 1, in which the QCL report 1000 only indicates which ports are QCL. These ports can be DMRS or CSI-RS ports, for example. Referring to FIG. 10, the QCL report 1000 includes one or more QCL port sets 101, for example 101A, 101B, . . . , 101N. The QCL port set 101A includes {port x, port y}. The QCL port set 101B includes {port a, port b, port c}.

FIG. 11 schematically depicts a QCL report 1100 according to an exemplary embodiment. Particularly, FIG. 11 schematically depicts the beam-level QCL report 1100 having Format 2, in which the QCL report 1100 indicates which ports are QCL (as per Format 1) and additionally indicates QCL beam indices from the QCL ports. The definition of beam here refers to beams shaped via different precoding matrices. In legacy LTE QCL assumptions, QCL between beams within the same antenna port were not considered. However, with different precoding matrices, beams may have significantly different channel characteristics. Therefore, QCL report 1100 having Format 2 includes beam-level QCL to provide more detailed information. Referring to FIG. 11, the QCL report 1100 includes one or more QCL port sets 112, for example 112A, 112B, . . . , 112N. The QCL port set 112A includes {port x beam m, port y beam n}. The QCL port set 112B includes {port a beam p, port b beam q, port c beam r}.

FIG. 12 schematically depicts a QCL report 1200 according to an exemplary embodiment. Particularly, FIG. 12 schematically depicts the resource-level QCL report 1200 having Format 3, in which the QCL report 1200 indicates only which resources are QCL. In each resource, there may be many antenna ports. Resource-level QCL may simultaneously indicate that multiple antenna ports are QCL, such that a feedback overhead for the QCL report 1200 may be reduced. Referring to FIG. 12, the QCL report 1200 includes one or more QCL resource sets 123, for example 123A, 123B, . . . , 123N. The QCL resource set 123A includes {resource x, resource y}. The QCL resource set 123B includes {resource a, resource b, resource c}.

FIG. 13 schematically depicts a QCL report 1300 according to an exemplary embodiment. Particularly, FIG. 13 depicts the QCL report 1300 provided as and/or comprising a bit map. The bit map comprises and/or is a codeword with ½N(N-1) bits, representing the upper right triangle of the matrix (as shown in FIG. 13) and indicating, by a 1, that two antenna ports and/or beams and/or resources are QCL and, by a 0, otherwise. N represents a number of antenna ports for the QCL report of Format 1, as described above, a total number of beams from all antenna ports for the QCL report Format 2, as described above, and/or a number of resources for the QCL report Format 3, as described above. If two antenna ports and/or beams and/or resources are QCL, the corresponding bit is set to 1 and 0 otherwise. In this way, QCL reports of Formats 1, 2 and 3 may be provided, for example, as bit maps.

FIG. 14 schematically depicts a part of a method according to an exemplary embodiment. Particularly, FIG. 14 schematically depicts a method of transmitting a QCL report. The QCL report is conveyed via a CSI report, which may be on a physical uplink control channel (PUCCH) or a physical uplink shared channel (PUSCH).

Referring to FIG. 14, at step 1401, the UE determines whether a request for the QCL report is received. If a request for the QCL report is received by the UE, the method proceeds to step 1403. Otherwise, if the request for the QCL report is not received by the UE, the method proceeds to step 1405.

At step 1403, the UE transmits the QCL report via CSI report. At step 1405, the UE transmits a normal CSI report.

Although a preferred embodiment has been shown and described, it will be appreciated by those skilled in the art that various changes and modifications might be made without departing from the scope of the invention, as defined in the appended claims and as described above.

In summary, the invention provides a method of controlling a network. Also provided are a transmission/reception point (TRP), a user equipment (UE), a system comprising a TRP and a UE, and a computer-readable storage medium. The network comprises a first transmission/reception point (TRP) and a first user equipment (UE). The first UE performs channel measurements related to a first antenna port and a second antenna port. Based at least in part on the channel measurements, a QCL of the first antenna port and the second antenna port is determined. Based at least in part on the determined QCL, a network configuration is adjusted. In this way, an increased number and/or number density of TRPs and/or Ues may be supported while maintaining and/or improving system performance and/or QoS.

In one example, there is provided the method of controlling a network comprising a first TRP and a first UE, the method includes performing, by the first UE, channel measurements related to a first antenna port and a second antenna port, determining, based at least in part on the channel measurements, a quasi co-location (QCL) of the first antenna port and the second antenna port, and adjusting a network configuration based at least in part on the determined QCL.

In other words, the QCL of the first antenna port and the second antenna port is determined based at least in part on the channel measurements performed by the first UE, and the network configuration adjusted accordingly. In this way, system performance and/or QoS may be maintained and/or improved. Determining the QCL according to this method may, for example, complement, improve and/or supersede conventional QCL determination, such as via geo-locations of the first antenna port and the second antenna port. Such conventional QCL determination may be not accurate and/or precise and/or sufficiently accurate and/or sufficiently precise, for example for NR applications. For example, if the first antenna port and the second antenna port are geographically separated, according to the conventional QCL determination, these two antenna ports are determined to be non-QCL, since they have discernibly different geo-locations. However, these two antenna ports may still share common clusters, thereby sharing similar large-scale channel properties including one or more of: average delay, delay spread, Doppler spread, Doppler shift, average gain and spatial parameters. That is, according to the conventional QCL determination, these two antenna ports may be incorrectly determined as non-QCL. In contrast, according to the method provided herein, the QCL of these two antenna ports is determined based at least in part on the channel measurements performed by the first UE, thereby overcoming a limitation of the conventional QCL determination. In this way, an increased number and/or number density of TRPs and/or Ues may be supported while maintaining and/or improving system performance and/or QoS. The number density of the TRPs and/or the Ues may relate to and/or be, for example, the respective numbers of the TRPs and/or the Ues within a predetermined geographical area, for example 1 km×1 km, 100 m×100 m or any other such area.

QCL of spatial information is important for the TRP to decide, for example, network coordination schemes, especially for coherent joint transmission (CJT). In NR CJT, a scenario may require that two antenna ports with different geo-locations are QCLed with respect to one or more of:

average delay, delay spread, Doppler spread, Doppler shift, average gain and spatial parameters. Legacy LTE QCL assumptions cannot support such a scenario since conventional QCL assumptions are based, for example exclusively or purely, on geo-locations from the NW side without considering UE measurements, for example.

It should be understood that the first TRP and the second TRP may be similar, for example, interchangeable. Hence, references herein to the first TRP, the second TRP and/or another TRP, for example a TRP, may be interchanged. It should be understood that the first UE and the second UE may be similar, for example, interchangeable. Hence, references herein to the first UE, the second UE and/or another UE, for example a UE, may be interchanged.

Generally, in Universal Mobile Telecommunications System (UMTS) and 3GPP Long Term Evolution (LTE), Ues allow users to access network services. In other words, a UE is any device used by a user to communicate on a network. The UE may be, for example, a device comprising a transmitter and a receiver or a transceiver, such as a mobile telephone or a laptop computer equipped with a mobile broadband adapter. The user may be a human user or a non-human user, for example a vehicle or infrastructure. The UE may connect to or communicate with or via an access point (AP) for example a Universal Terrestrial Radio Access Network (UTRAN) access point such as a base station Node B (Node B or NB) and/or an evolved base station Node B (eNodeB or Enb and/or a gNodeB (Gnb). That is, the UE may transmit data to and/or receive data from the access point, as described below. Furthermore, the device may connect to or communicate with or via another such UE.

The TRP comprises and/or is an access point, for example a UTRAN access point. It should be understood that an UTRAN access point may be a conceptual point within the UTRAN performing radio transmission and reception. The UTRAN access point may be associated with one specific cell. That is, there may exist one UTRAN access point, for example a TRP, for each cell. The UTRAN access point may be the UTRAN-side end point of a radio link. In other words, the TRP may define a cell.

It should be understood that a cell may be a radio network object that may be uniquely identified by the UE from a cell identification that is broadcast over a geographical area from one UTRAN access point. A cell may be in either Frequency Division Duplex (FDD) or Time Division Duplex (TDD) mode.

It should be understood that a sector may be a sub-area of a cell. All sectors within the cell may be served by the same access point. A radio link within the sector may be identified by a single logical identification belonging to the sector.

In one example, the first antenna port and the second antenna port have different geo-locations, for example, resolvable and/or discernible and/or distinguishable geo-locations, for example according to geo-location measurements. In one example, the first antenna port and the second antenna port have the same geo-location, for example according to geo-location measurements.

In one example, the performing the channel measurements is on a first reference signal and a second reference signal received by the first UE.

In one example, the performing the channel measurements comprises estimating a channel coefficient and/or a plurality of channel coefficients, for example, for the first TRP and/or the second TRP. In one example, estimating the channel coefficient comprises estimating the channel coefficient based, at least in part, on the first reference signal transmitted by the second TRP and/or on the second reference signal transmitted by the first TRP. For example, the channel coefficient for a second TRP may be estimated based, at least in part, on a ZP CSI-RS transmitted by the first TRP, or vice versa.

In one example, the performing, by the first UE, the channel measurements related to the first antenna port and the second antenna port comprises successively performing, by the first UE, the channel measurements related to the first antenna port and the second antenna port. In one example, the performing, by the first UE, the channel measurements related to the first antenna port and the second antenna port comprises simultaneously performing, by the first UE, the channel measurements related to the first antenna port and the second antenna port.

In one example, the method comprises transmitting the first reference signal and the second reference signal by the network.

In one example, the method comprises transmitting the first reference signal and the second reference signal via the first antenna port and the second antenna port respectively.

In one example, the first reference signal and the second reference signal are transmitted by the first TRP and a second TRP respectively.

In one example, the method comprises transmitting the first reference signal and the second reference signal via a first antenna panel and a second antenna panel respectively.

In one example, the method comprises transmitting, by the first TRP, the first reference signal and the second reference signal via the first antenna panel and the second antenna panel respectively.

In one example, the method comprises transmitting, by the first TRP and by the second TRP respectively, the first reference signal and the second reference signal via the first antenna panel and the second antenna panel respectively.

In one example, the first reference signal and/or the second reference signal comprises a demodulation reference signal (DMRS).

In one example, the first reference signal and/or the second reference signal comprises a channel state information reference signal (CSI-RS). In one example, the first reference signal and/or the second reference signal comprises a zero power (ZP) CSI-RS and/or a non-ZP (NZP) CSI-RS.

In one example, the first reference signal and/or the second reference signal comprises a phase tracking reference signal (PTRS).

In one example, the performing the channel measurements is on the first reference signal and the second reference signal received by the first UE, wherein the first reference signal comprises a DMRS, a CSI-RS for example a ZP CSI-RS and/or a NZP CSI-RS and/or a PTRS and wherein the second reference signal comprises a DMRS, a CSI-RS for example a ZP CSI-RS and/or a NZP CSI-RS and/or a PTRS. For example, the first reference signal may be a DMRS and the second reference signal may be a CSI-RS, or vice versa. For example, the performing the channel measurements may be on a DMRS (i.e. the first reference signal) and a NZP CSI-RS (i.e. the second reference signal), wherein the DMRS and the NZP-RS are both transmitted by the first TRP or the second TRP or wherein the DMRS and the NZP-RS are transmitted by the first TRP and the second TRP respectively. Other combinations of the first reference signal and the second reference signal are possible. For example, the first reference signal may be a DMRS and the second reference signal may be a PTRS, or vice versa. For example, the first reference signal may be a CSI-RS and the second signal may be a PTRS, or vice versa.

In one example, the determining, based at least in part on the channel measurements, the QCL of the first antenna port and the second antenna port is by first UE.

In one example, the performing, by the first UE, channel measurements related to the first antenna port and the second antenna port is responsive to a request received by the first UE.

In one example, the method comprises transmitting, by the first TRP, the request.

In one example, the method comprises establishing a QCL report.

In one example, the method comprises establishing the QCL report by the first UE.

In one example, the method comprises transmitting the QCL report to the first TRP.

In one example, the method comprises transmitting, by the first UE, the QCL report to the first TRP.

In one example, the method comprises transmitting, by the first UE, the QCL report to the first TRP via a channel state information (CSI) report.

In one example, the method comprises transmitting, by the first UE, the QCL report to the first TRP via the CSI report via a physical uplink control channel (PUCCH) and/or a physical uplink shared channel (PUSCH).

In one example, the method comprises transmitting, by the first TRP request, a request for the QCL report to the first UE.

In one example, the QCL report comprises port, beam and/or resource information.

In one example, the QCL report comprises a port-level QCL report, in which the port-level QCL report only indicates which ports are QCL. These ports may be DMRS or CSI-RS ports, for example. The port-level QCL may include one or more QCL port sets, each port set including a plurality, for example two and/or pairs, of QCL ports.

In one example, the QCL report comprises a beam-level QCL report, in which the beam-level QCL report indicates which ports are QCL and indicates QCL beam indices from the QCL ports. The definition of beam here refers to beams shaped via different precoding matrices. In legacy LTE QCL assumptions, QCL between beams within the same antenna port were not considered. However, with different precoding matrices, beams may have significantly different channel characteristics. Therefore, the beam-level QCL report includes beam-level QCL to provide more detailed information. The port-level QCL may include one or more QCL port sets, each port set including a plurality, for example two and/or pairs, of related QCL ports and beams, for example QCL port and beam pairs.

In one example, the QCL report comprises a resource-level QCL report, in which the resource-level QCL report indicates only which resources are QCL. In each resource, there may be many antenna ports. Resource-level QCL may simultaneously indicate that multiple antenna ports are QCL, such that a feedback overhead for the resource-level QCL report may be reduced. The resource-level QCL may include one or more QCL resource sets, each resource set including a plurality of QCL resources.

In one example, the adjusting the network configuration is based on the QCL report.

In one example, the QCL report comprises and/or is provided as a bit map. The bit map may comprise and/or be a codeword with ½N(N-1) bits, representing a part of a matrix, for example, an upper right triangle of the matrix and may indicate, by a 1, that two antenna ports and/or beams and/or resources are QCL and, by a 0, otherwise. N may represent a number of antenna ports, a total number of beams from all antenna ports, and/or a number of resources. If two antenna ports and/or beams and/or resources are QCL, the corresponding bit may be set to 1 and 0 otherwise.

In one example, the adjusting the network configuration comprises adjusting a transmission coordination scheme and/or a network coordination scheme.

In one example, the method comprises informing, by the network to the first UE and/or a second UE and/or a second TRP, the adjusted network configuration. That is, the adjusted network configuration may be explicitly communicated, for example, by the first TRP.

In one example, the method comprises assuming, by the first UE and/or a second UE and/or a second TRP, the adjusted network configuration. That is, the adjusted network configuration may be implicitly communicated.

In one example, the performing, by the first UE, the channel measurements related to the first antenna port and the second antenna port comprises performing, by the first UE, the channel measurements related to a plurality of first antenna ports and/or a plurality of second antenna ports, for example, for a plurality of first TRPs and/or a plurality of second TRPs.

In one example, the determining, based at least in part on the channel measurements, the QCL of the first antenna port and the second antenna port comprises determining, based at least in part on the channel measurements, the QCL of a plurality of first antenna ports and/or a plurality of second antenna ports, for example, for a plurality of first TRPs and/or a plurality of second TRPs. In one example, the QCL report includes a plurality of QCLs for the plurality of first antenna ports and/or the plurality of second antenna ports.

In one example, there is provided the system comprising a first transmission/reception point (TRP) and a first user equipment (UE);

wherein the first UE is arranged to:

perform channel measurements related to a first antenna port and a second antenna port;

wherein the system is arranged to:

determine, based at least in part on the channel measurements, a quasi co-location (QCL) of the first antenna port and the second antenna port; and adjust a network configuration based at least in part on the determined QCL.

The UE and/or the TRP may be as described herein. Particularly, the UE and/or the TRP may be arranged to perform any of the methods as set forth herein.

In one example, there is provided the transmission/reception point (TRP) arranged to communicate with a user equipment (UE), wherein the TRP device is further arranged to: adjust a network configuration based, at least in part, on a quasi co-location (QCL) of a first antenna port and a second antenna port, wherein the QCL is determined based, at least in part, on channel measurements related to the first antenna port and the second antenna port performed by the UE.

The UE and/or the TRP may be as described herein. Particularly, the UE and/or the TRP may be arranged to perform any of the methods as set forth herein.

In one example, the UE is arranged to perform the channel measurements is on a first reference signal and a second reference signal received by the UE.

In one example, the network is arranged to transmit the first reference signal and the second reference signal. For example, the TRP may be arranged to transmit the first reference signal and/or the second reference signal.

In one example, the network is arranged to transmit the first reference signal and the second reference signal via the first antenna port and the second antenna port respectively. For example, the TRP may be arranged to transmit the first reference signal and/or the second reference signal via the first antenna port and/or the second antenna port respectively.

In one example, the TRP comprises the first antenna port and/or the second antenna port. In one example, the TRP comprises a plurality of first antenna ports and/or a plurality of second antenna ports.

In one example, the first TRP and a second TRP are arranged to transmit the first reference signal and the second reference signal respectively.

In one example, the first TRP and a second TRP are arranged to transmit the first reference signal and the second reference signal via a first antenna panel and a second antenna panel respectively.

In one example, the TRP comprises the first antenna panel and/or the second antenna panel. In one example, the TRP comprises a plurality of first antenna panels and/or a plurality of second antenna panels. The first antenna panel may comprise the first antenna port and/or the second antenna port. The second antenna panel may comprise the first antenna port and/or the second antenna port.

In one example, the TRP comprises the first antenna port and the second TRP comprises the second antenna port. In one example, the TRP comprises the first antenna panel comprising the first antenna port and the second TRP comprises the second antenna panel comprising the second antenna port.

In one example, the TRP is arranged to transmit the first reference signal and the second reference signal via the first antenna panel and the second antenna panel respectively.

In one example, the TRP and the second TRP are respectively arranged to transmit the first reference signal and the second reference signal via the first antenna panel and the second antenna panel respectively.

In one example, the first reference signal and/or the second reference signal comprises a demodulation reference signal (DMRS).

In one example, the first reference signal and/or the second reference signal comprises a channel state information reference signal (CSI-RS). In one example, the first reference signal and/or the second reference signal comprises a zero power (ZP) CSI-RS and/or a NZP CSI-RS.

In one example, the first reference signal and/or the second reference signal comprises a phase tracking reference signal (PTRS).

In one example, the TRP is arranged to transmit a request to the UE to perform, by the first UE, channel measurements related to the first antenna port and the second antenna port.

In one example, the TRP is arranged to receive a QCL report transmitted by the TRP.

In one example, the TRP is arranged to receive the QCL report via a channel state information (CSI) report.

In one example, the TRP is arranged to receive the QCL report via the CSI report via a physical uplink control channel (PUCCH) and/or a physical uplink shared channel (PUSCH).

In one example, the TRP is arranged to transmit a request for the QCL report to the UE.

In one example, the QCL report comprises port, beam and/or resource information.

In one example, the TRP is arranged to adjust the network configuration based on the QCL report.

In one example, the TRP is arranged to adjust the network configuration by adjusting a transmission coordination scheme and/or a network coordination scheme.

In one example, the TRP is arranged to inform the first UE and/or a second UE and/or a second TRP, the adjusted network configuration.

In one example, there is provided the user equipment (UE) arranged to communicate with a transmission/reception point (TRP), wherein the UE is further arranged to: perform channel measurements related to a first antenna port and a second antenna port; such that a network configuration is adjustable based, at least in part, on a quasi co-location (QCL) of the first antenna port and the second antenna port determined based, at least in part, on the channel measurements performed by the UE.

The UE and/or the TRP may be as described herein. Particularly, the UE and/or the TRP may be arranged to perform any of the methods as set forth herein.

In one example, the UE is arranged to perform the channel measurements on a first reference signal and a second reference signal received by the first UE.

In one example, the UE is arranged to receive the first reference signal and the second reference signal transmitted by the network.

In one example, the first reference signal and the second reference signal are transmitted via the first antenna port and the second antenna port respectively.

In one example, the first reference signal and the second reference signal are transmitted by the TRP and a second TRP respectively.

In one example, the first reference signal and the second reference signal are transmitted via a first antenna panel and a second antenna panel respectively.

In one example, the first reference signal and the second reference signal are transmitted by the TRP via the first antenna panel and the second antenna panel respectively.

In one example, the first reference signal and the second reference signal are transmitted by the TRP and by a second TRP respectively, via the first antenna panel and the second antenna panel respectively.

In one example, the first reference signal and/or the second reference signal comprises a demodulation reference signal (DMRS).

In one example, the first reference signal and/or the second reference signal comprises a channel state information reference signal (CSI-RS).

In one example, the first reference signal and/or the second reference signal comprises a phase tracking reference signal (PTRS).

In one example, the UE is arranged to determine, based at least in part on the channel measurements, the QCL of the first antenna port and the second antenna port is by first UE.

In one example, the UE is arranged to perform the channel measurements related to the first antenna port and the second antenna port responsive to a request received by the first UE.

In one example, the request is transmitted by the TRP.

In one example, the UE is arranged to establish the QCL report.

In one example, the UE is arranged to transmit the QCL report to the first TRP.

In one example, the UE is arranged to transmit the QCL report to the first TRP via a channel state information (CSI) report.

In one example, the UE is arranged to transmit the QCL report to the first TRP via the CSI report via a physical uplink control channel (PUCCH) and/or a physical uplink shared channel (PUSCH).

In one example, the UE is arranged to receive a request for the QCL report transmitted, for example, by the TRP.

In one example, the QCL report comprises port, beam and/or resource information.

In one example, the network configuration is adjusted based on the QCL report, for example, by the network and/or by the TRP.

In one example, the adjusting the network configuration comprises adjusting a transmission coordination scheme and/or a network coordination scheme.

In one example, the UE is arranged to be informed of the adjusted network configuration, for example, the UE is arranged to receive the adjusted network configuration. That is, the adjusted network configuration may be explicitly communicated.

In one example, the UE is arranged to assume the adjusted network configuration. That is, the adjusted network configuration may be implicitly communicated.

In one example, there is provided a tangible non-transient computer-readable storage medium having recorded thereon instructions which when implemented by a first transmission/reception point (TRP) and/or a first user equipment (UE), cause the first TRP and/or the first UE to perform a method of controlling a network comprising the first TRP and the first UE, to perform any of the methods as set forth herein.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims and drawings), and/or all of the steps of any method or process so disclosed, may be combined in any combination, except combinations where at least some of such features and/or steps are mutually exclusive.

Each feature disclosed in this specification (including any accompanying claims, and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims and drawings), or to any novel one, or any novel combination, of the steps of any method or process so disclosed.

The invention claimed is:

1. A method for operating a user equipment (UE) in a wireless communication system, the method comprising:
   receiving a first reference signal and a second reference signal;
   performing channel measurements related to a first antenna port and a second antenna port by using the first reference signal and the second reference signal;
   determining, based at least in part on the channel measurements, a quasi co-location (QCL) of the first antenna port and the second antenna port; and
   receiving information regarding a network configuration that is adjusted based at least in part on the determined QCL.

2. The method of claim 1, receiving the first reference signal and the second reference signal comprises:
   receiving the first reference signal and the second reference signal via the first antenna port and the second antenna port respectively.

3. The method of claim 1, wherein the first reference signal and the second reference signal are transmitted by a first transmission/reception points (TRP) and a second TRP, respectively.

4. The method of claim 1, wherein the first reference signal and the second reference signal are transmitted via a first antenna panel and a second antenna panel respectively.

5. The method of claim 4, wherein the first antenna panel is located in a first transmission/reception points (TRP), and
   wherein the second antenna panel is located in a second TRP.

6. The method of claim 4, wherein the first antenna panel and the second antenna panel are located in a transmission/reception points (TRP).

7. The method of claim 1, wherein at least one of the first reference signal or the second reference signal comprises a demodulation reference signal (DMRS).

8. The method of claim 1, wherein at least one of the first reference signal or the second reference signal comprises a channel state information reference signal (CSI-RS).

9. The method of claim 1, wherein the first reference signal or the second reference signal comprises a phase tracking reference signal (PTRS).

10. The method of claim 1, further comprising:
    receiving a request for a QCL report; and
    transmitting a QCL report based on the QCL of the first antenna port and the second antenna port,
    wherein the QCL report comprises at least one of port, beam or resource information.

11. The method of claim 10, wherein the QCL report is transmitted via a channel state information (CSI) report.

12. The method of claim 10, wherein the QCL report is transmitted via a physical uplink control channel (PUCCH) or a physical uplink shared channel (PUSCH).

13. A method for operating a base station in a wireless communication system, the method comprising:
    transmitting at least one of a first reference signal or a second reference signal;
    receiving information regarding a quasi co-location (QCL) of a first antenna port and a second antenna port that is determined based on the first reference signal and the second reference signal;
    adjusting a network configuration based at least in part on the QCL; and
    transmitting information regarding the network configuration.

14. The method of claim 13, wherein the adjusting the network configuration comprises, adjusting a transmission coordination scheme or a network coordination scheme.

15. A user equipment (UE) in a wireless communication system, the user equipment comprising:
    a transceiver; and
    at least one processor operably coupled to the transceiver, and configured to:
    receive a first reference signal and a second reference signal;
    perform channel measurements related to a first antenna port and a second antenna port by using the first reference signal and the second reference signal;
    determine, based at least in part on the channel measurements, a quasi co-location (QCL) of the first antenna port and the second antenna port; and receive information regarding a network configuration that is adjusted based at least in part on the determined QCL.

16. The user equipment of claim 15, wherein the at least one processor is further configured to:
receive the first reference signal and the second reference signal via the first antenna port and the second antenna port respectively.

17. The user equipment of claim 15, wherein the first reference signal and the second reference signal are transmitted by a first transmission/reception points (TRP) and a second TRP respectively.

18. The user equipment of claim 15, wherein the first reference signal and the second reference signal are transmitted via a first antenna panel and a second antenna panel respectively.

19. The user equipment of claim 15, wherein the first reference signal or the second reference signal comprises a demodulation reference signal (DMRS).

20. The user equipment of claim 15, wherein the first reference signal or the second reference signal comprises a channel state information reference signal (CSI-RS).

* * * * *

UNITED STATES PATENT AND TRADEMARK OFFICE
CERTIFICATE OF CORRECTION

PATENT NO. : 11,038,558 B2
APPLICATION NO. : 16/638119
DATED : June 15, 2021
INVENTOR(S) : Shangbin Wu et al.

It is certified that error appears in the above-identified patent and that said Letters Patent is hereby corrected as shown below:

On the Title Page

Item (30) Foreign Application Priority Data "Aug. 10, 2017 (GB)................1712852" should read -- Aug. 10, 2017 (GB)...............1712852.1 --.

Signed and Sealed this
Twenty-first Day of September, 2021

Drew Hirshfeld
*Performing the Functions and Duties of the*
*Under Secretary of Commerce for Intellectual Property and*
*Director of the United States Patent and Trademark Office*